United States Patent [19]

Takahashi et al.

[11] Patent Number: 4,535,238
[45] Date of Patent: Aug. 13, 1985

[54] RADIATION IMAGE RECORDING AND REPRODUCING METHOD

[75] Inventors: Kenji Takahashi; Takashi Nakamura, both of Kanagawa, Japan

[73] Assignee: Fuji Photo Film Co., Ltd., Kanagawa, Japan

[21] Appl. No.: 560,815

[22] Filed: Dec. 13, 1983

[30] Foreign Application Priority Data

Dec. 15, 1982 [JP] Japan .................................. 57-218394

[51] Int. Cl.$^3$ .......................... G03C 5/16; C09K 11/46
[52] U.S. Cl. ........................... 250/327.2; 252/301.4 H
[58] Field of Search ............... 250/327.2; 252/301.4 H

[56] References Cited

U.S. PATENT DOCUMENTS 4,080,306  3/1978  Ferretti ........................ 252/301.4 H

OTHER PUBLICATIONS

Stevels, et al., "BaFCl:Eu$^{2+}$, A New Phosphor For X-Ray Intensifying Screens", Philips Research Report, Oct.-75., (Philips Res. Repts. 30, 277-290).

Primary Examiner—Alfred E. Smith
Assistant Examiner—Richard Hanig
Attorney, Agent, or Firm—Murray, Whisenhunt & Ferguson

[57] ABSTRACT

A radiation image recording and reproducing method comprising steps of:
(i) causing a radiation image storage panel to absorb a radiation having passed through an object or having radiated from an object, the radiation image storage panel containing a divalent europium activated barium fluorobromide phosphor showing a stimulation spectrum in which the emission intensity at the stimulation wavelength of 500 nm is higher than the emission intensity at the stimulation wavelength of 600 nm;
(ii) exposing said radiation image storage panel to an electromagnetic wave having a wavelength within the range of 400-500 nm, the wavelength of 550 nm being exclusive, such as Ar ion laser beam to release the radiation energy stored therein as light emission; and
(iii) detecting the emitted light.

6 Claims, 2 Drawing Figures

RADIATION IMAGE RECORDING AND REPRODUCING METHOD

BACKGROUND OF THE INVENTION

1. Field of the Invention

The present invention relates to a radiation image recording and reproducing method, more particularly, to a radiation image recording and reproducing method utilizing a divalent europium activated barium fluorobromide stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the above-mentioned conventional radiography, a radiation image recording and reproducing method utilizing a stimulable phsophor described, for instance, in U.S. Pat. No. 4,239,968, has been recently paid much attention. The radiation image recording and reproducing method involves steps of causing the stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically converting the emitted light to electric signals; and reproducing the electric signals as a visible image on a recording material such as a photo-sensitive film or on a displaying device such as CRT.

Examples of the stimulable phosphor employable in the above-mentioned radiation image recording and reproducing method include a cerium and samarium activated strontium sulfide phosphor (SrS:Ce,Sm), an europium and samarium activated strontium sulfide phosphor (SrS:Eu, Sm), an erbium activated thorium dioxide phosphor ($ThO_2$: Er), and an europium and samarium activated lanthanum oxisulfide phosphor ($La_2O_2S$:Eu,Sm), as disclosed in U.S. Pat. No. 3,859,527. Further, the above-mentioned U.S. Pat. No. 4,239,968 discloses an alkaline earth metal fluorohalide phosphor having the formula $(Ba_{1-x},M^{2+}_x)FX$: yA, in which $M^{2+}$ is at least one divalent metal selected from the group consisting of Mg, Ca, Sr, Zn and Cd; X is at least one halogen selected from the group consisting of Cl, Br and I; A is at least one element selected from the group consisting of Eu, Tb, Ce, Tm, Dy, Pr, Ho, Nd, Yb and Er; and x and y are numbers satisfying the conditions of $0 \leq x \leq 0.6$ and $0 \leq y \leq 0.2$, respectively.

In the above-described radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

The radiation image recording and reproducing method is, as described above, very useful for obtaining a radiation image as a visible image, but it is desired that the sensitivity of the method to the radiation is as high as possible to decrease the exposure dose. Especially when the radiation is applied to a human body as described above, the enhancement in the sensitivity of the method is of much value from the viewpoint of adverse effect of the radiation on the human body, even if the level of the enhancement is not so remarkable.

The sensitivity essentially depends on the intensity of stimulated emission of the phosphor employed in the radiation image recording and reproducing method. In general, the nearer the wavelength of stimulating rays comes to the peak wavelength in the stimulation spectrum of the phosphor employed in the method, the more the sensitivity of the method is enhanced, while the farther the wavelength of stimulating rays goes away from said peak wavelength, the more the sharpness of the image provided by the method is enhanced. Accordingly, it is desired to employ a stimulable phosphor showing stimulated emission of high intensity and to employ stimulating rays in combination with the stimulable phosphor, which have a stimulation wavelength to be as near as possible to the peak wavelength of the stimulation spectrum thereof, in order to obtain a high sensitive method.

For instance, a divalent europium activated barium fluorobromide phosphor (BaFBr:$Eu^{2+}$; a phosphor of the above-mentioned formula disclosed in U.S. Pat. No. 4,239,968 in which x is 0), which is a representative one as the stimulable phosphor employable in the radiation image recording and reproducing method, gives light emission of high intensity (stimulated emission) with a peak wavelength of approximately 390 nm, and is of great value in practical use. It is heretofore known that the instant phosphor shows the maximum emission intensity at a stimulation wavelength of approximately 600 nm.

In practicing the radiation image recording and reproducing method utilizing the above-described phosphor, stimulating rays having a wavelength close to the peak wavelength of the stimulation spectrum thereof, namely approx. 600 nm, are employed to enhance to sensitivity, whereby reducing the exposure dose given to the object.

In the radiation image recording and reproducing method, a stimulable phosphor is generally employed in the form of a radiation image storage panel containing thereof. The radiation image storage panel comprises a support and a phosphor layer containing a stimulable phosphor which is provided on one surface of the support.

The radiation image storage panel employed in the method hardly deteriorates upon exposure to a radiation and stimulating rays, so that the panel can be used repeatedly for a long period. In practical use, however, after scanning the panel with stimulating rays (otherwise, in advance of next use of the panel), light in the stimulation wavelength region of the phosphor is applied to the panel so as to erase the radiation energy remaining in the panel, as disclosed in Japanese Patent Provisional Publication 56(1981)-11392 (corresponding to U.S. Pat. No. 4,400,619 and European patent publication No. 80103974.4). That is because the radiation energy stored in the panel is not completely released by scanning with the stimulating rays and a portion of the radiation energy still remains therein.

However, when the conventional divalent europium activated barium fluorobromide phosphor having such a stimulation spectrum that the emission intensity at the stimulation wavelength of 500 nm is lower than that at the stimulation wavelength of 600 nm, as described above, is employed, there is a tendency that the radiation energy remaining in the radiation image storage panel cannot be completely erased even by subjecting the panel to the above-described erasing procedure, and the unerased radiation energy remaining in the panel can be released upon exposure to stimulating rays with a lapse of time. This phenomenon is presumed to occur by the following reason.

When radiation energy is stored in the phosphor of the radiation image storage panel, a number of electrons in the phosphor are trapped in several trap levels, that is in the semi-stable state. Most of the electrons in the semi-stable state generally return to the ground state with light emission when exposing the phosphor to the stimulating rays and erasing light. On the other hand, a portion of the electrons are still kept in the semi-stable state even after the phosphor is stimulated with the stimulating rays and the erasing light, because these electrons are trapped in such trap levels as to be difficult in returning to the ground state by the stimulation. However, with a lapse of time the electrons kept in such trap levels transfer to the level to release energy easily by the stimulation, so that the electrons can return to the ground state with releasing light by the stimulation after a lapse of certain time.

In the case where the above-described phenomenon occurs, even if the radiation image storage panel is subjected to the erasing procedure, the radiation energy still remaining in the panel is released together with a radiation energy stored freshly therein in the subsequent use. This phenomenon is called "appearance of after-image". Since the appearance of after-image gives a noise in the subsequent use of the panel, it is required to avoid occurrence of such phenomenon as completely as possible. However, the sufficient prevention of the appearance of after-image can be hardly attained only by the conventional erasing procedure. Further, in order to prevent the appearance of after-image only by the erasing procedure, a complicated operaton such as repeating of erasing procedures is required, and these operations reduce advantages of the radiation image recording and reproducing method.

Accordingly, it is desired that the radiation energy still remaining in the panel after scanning with stimulating rays can be erased to such a level that the appearance of after-image does not substantially occur by the single erasing procedure. In other words, it is desired that all the radiation energy, or at least most of the radiation energy stored in the phosphor can be easily released upon exposure to a light within the stimulation wavelength region of stimulated emission of the phosphor.

Further, there arises another problem in the use of the aforementioned divalent europium activated barium fluorobromide phosphor in the radiation image storage panel.

For obtaining the radiation image stored in the radiation image storage panel as electric signals in the above-described radiation image recording and reproducing method, the light emission emitted from the radiation image in the panel is photo-electrically processed (or read out). This photo-electrical read-out procedure of the radiation image generally comprises a preliminary read-out procedure and a final read-out procedure. In the preliminary read-out procedure, the panel is scanned with a weak light to read out a portion of the radiation image stored in the panel, whereby determining the conditions for processing the signals to obtain an image having a suitable density and contrast in the final read-out procedure. In a control circuit to determine the signal processing conditions, several data such as a ratio between the intensity of laser beam employed for scanning in the preliminary read-out procedure and that in the final read-out procedure, a ratio between the amount of stimulated emission released from the panel in the preliminary read-out procedure and that in the final read-out procedure, and the like is beforehand input. In the following final read-out procedure, the panel is scanned with a strong light to read out the radiation image stored in the panel so as to obtain electric signals, and the electric signals are automatically processed in accordance with the previously determined conditions.

In the above-described procedures, the problem is that the aforementioned conventional divalent europium activated barium fluorobromide phosphor is liable to show a fading phenomenon. That is, the stimulation spectrum of the phosphor varies in its shape with a lapse of time after exposure to a radiation. The so varying stimulation spectrum results in greater reduction of the emission intensity especially in the wavelength region longer than 600 nm. Accordingly, the ratio between the amount of stimulated emission in the preliminary read-out precedure and that in the final read-out procedure is liable to vary as time goes by.

More in detail, since the ratio between the amount of stimulated emission (a read-out value) converted to electric signals in the above-mentioned preliminary read-out procedure and that in the final read-out procedure varies with lapse of time, the electric signals cannot be necessarily processed suitably and an image having a proper density and contrast cannot be obtained if the exposure time is not beforehand input in the control circuit, or if the read-out procedure is done at a time different from the time previously set for the final read-out. Accordingly, a stimulable phosphor employed in the radiation image recording and reproducing method is desired to show minimum variation of the ratio between the amount of emitted light in the preliminary read-out procedure and that in the final read-out procedure with a lapse of time.

SUMMARY OF THE INVENTION

An object of the present invention is to provide a radiation image recording and reproducing method enhanced in the sensitivity thereof.

Another object of the invention is to provide a radiation image recording and reproducing method in which the appearance of after-image is substantially avoided.

A further object of the invention is to provide a radiation image recording and reproducing method enhanced in the other qualities of the image provided thereby.

These objects can be accomplished by the radiation image recording and reproducing method of the present invention comprising steps of:

(i) causing a radiation image storage panel to absorb a radiation having passed through an object or having radiated from an object, the radiation image storage panel containing a divalent europium activated barium fluorobromide phosphor having a stimulation spectrum in which the emission intensity at the stimulation wavelength of 500 nm is higher than the emission intensity at the stimulation wavelength of 600 nm;

(ii) exposing said radiation image storage panel to an electromagnetic wave having a wavelength within the range of 400–500 nm, the wavelength of 550 nm being exclusive, to release the radiation energy stored therein as light emission; and (iii) detecting the emitted light.

As a result of studies of the present inventors, it has been discovered that the radiation image recording and reproducing method which employs a divalet europium activated barium fluorobromide phosphor having such a stimulation spectrum that the emission intensity at the stimulation wavelength of 500 nm is higher than the emission intensity at the stimulation wavelength of 600 nm, and also employs an electromagnetic wave having a wavelength within the range of 400–500 nm (550 nm is not inclusive) as stimulating rays gives higher sensitivity than the conventional radiation image recording and reproducing method does.

Further, in the radiation image recording and reproducing method of the present invention, the appearance of after-image does not substantially occur after the erasure of radiation energy remaining in the panel. More in detail, the radiation energy remaining in the panel can be erased to such a level as not giving the detrimental influence by the single erasing procedure, so that a noise stemmed from the after-image is hardly observed in the next use of the panel even though the panel is not subjected to the erasing procedure prior to the subsequent use.

Furthermore, the phosphor employed in the radiation image recording and reproducing method of the present invention does not vary the shape of stimulation spectrum thereof with a lapse of time after exposure to a radiation. Either the intensity of stimulated emission hardly varies by the fading. Accordingly, when a visible image is reproduced from the obtained information, the deterioration of quality of the image, which is caused by the fact that the electric signals obtained by reading out the emitted light is not processed under the optimum conditions due to variation of the amount ratio of emission occurring under the fading phenomenon, can be prevented.

11: radiation generating device, 12: object, 13: panel, 14: source of stimulating rays, 15: photosensor, 16: image reproducing device, 17: display device, 18: filter, 19: light source.

Figure 2:
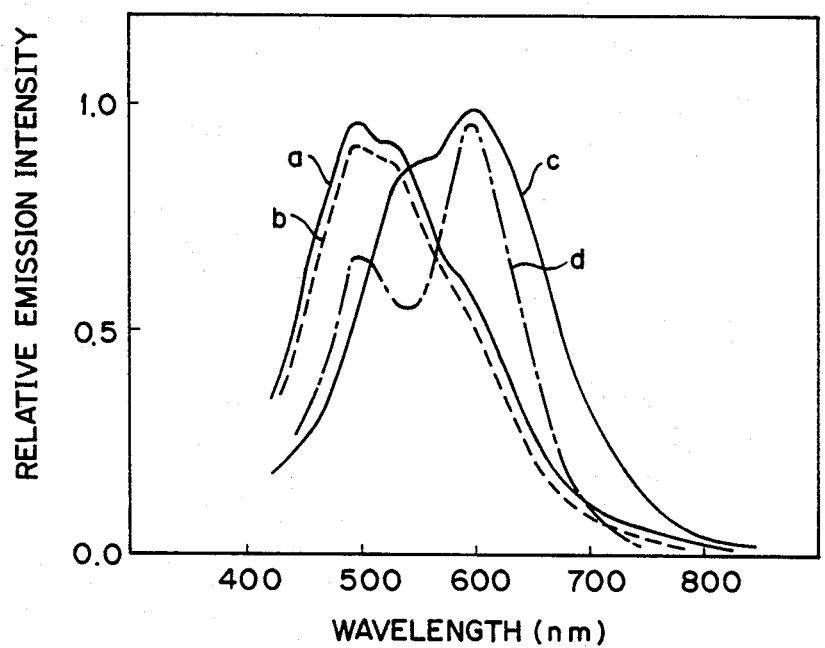

FIG. 2 graphically illustrates variation of a stimulation spectrum with a lapse of time (Spectrum a varies to Spectrum b) observed in the phosphor according to the radiation image recording and reproducing method of the present invention, and variation of stimulation spectrum with a lapse of time (Spectrum c to Spectrum d) observed in the conventional phosphor for comparison.

DETAILED DESCRIPTION OF THE INVENTION

The present invention brings about prominent enhancement in the above-described properties in the radiation image recording and reproducing method by employing as a stimulable phosphor a divalent europium activated barium fluorobromide phosphor having a stimulation spectrum in which the emission intensity at the stimulation wavelength of 500 nm is higher than the emission intensity at the stimulation wavelength of 600 nm, and also employing as stimulating rays an electromagnetic wave within the wavelength region of 400–550 nm (the wavelength of 550 nm is not inclusive).

Figure 1:
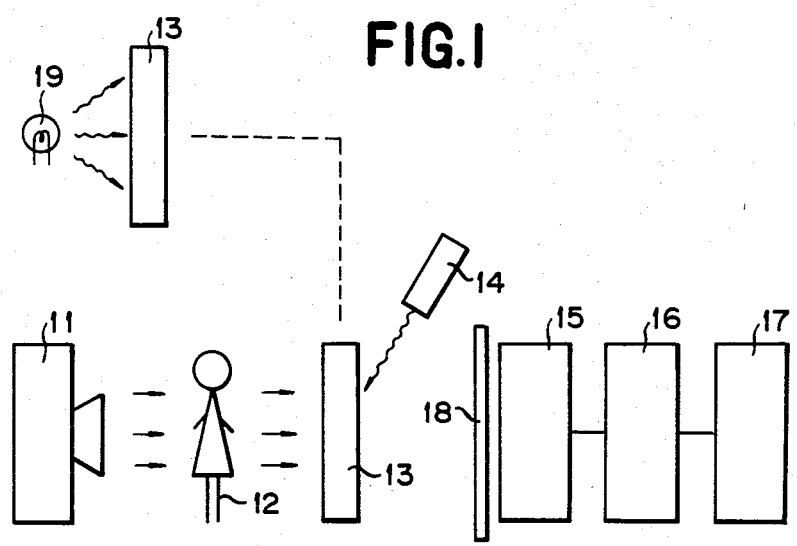
FIG. 1 is a schematic view showing the radiation image recording and reproducing method of the present invention, in which the numbers are used to designate the following.

The radiation image recording and reproducing method improved in the above-mentioned property is now described more in detail by referring to a schematic view shown in FIG. 1.

In FIG. 1 which shows the total system of the radiation image recording and reproducing method of the present invention, a radiation generating device 11 such as an X-ray source provides a radiation for irradiating an object 12 therewith; a radiation image storage panel 13 containing the divalent europium activated barium fluorobromide stimulable phosphor absorbs and stores energy of the radiation having passed through the object 12; a source of stimulating rays 14 provides an electromagnetic wave (stimulating rays) for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; a fliter 18 is disposed in front of the photosensor 15 to cut off the stimulating rays reflected by the panel 13 and allow only the light emitted by the panel 13 to pass through; and a light source 19 gives light for erasing the radiation energy remaining in the panel 13.

FIG. 1 illustrates an example of the system according to the method of the invention employed for obtaining a radiation image transmitted from an object. However, in the case that the object 12 itself emits a radiation, it is unnecessary to install the above-mentioned radiation generating device 11. Further, the devices 15 through 17 in the system can be replaced with other appropriate devices which can reproduce a radiation image having the information of the object 12 from the light emitted by the panel 13.

Referring to FIG. 1, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13 in proportion to the intensity of the radiation. Thus, a radiation energy-stored image (a kind of latent image) corresponding to the radiation image transmitted from the object 12 is formed on the panel 13.

Thereafter, when the radiation image storage panel 13 is exposed to an electromagnetic wave having the wavelength within the range of 400–550 nm (550 nm is not inclusive), which has been provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15. For instance, the detection of the radiation image stored in the panel 13 can be carried out by scanning the panel 13 with the electromagnetic wave provided by the source of stimulating rays 14 and detecting the light emitted from the panel 13 under the scanning by means of the photosensor 15 to sequentially obtain the electric signals. The electric signals are reproduced as an image in the image reproducing device 16, and the reproduced image is displayed on the display device 17. On the other hand, the radiation image storage panel 13 having released the radiation image as the stimulated emission is exposed to the light provided by the light source 19 to erase the radiation energy remaining in the panel 13. This exposure to the light provided by the light source 19 need to be done at least in advance of the subsequent use of the panel 13.

In the radiation image recording and reproducing method of the present invention, there is no specific limitation on the radiation employable for exposure of an object to obtain a radiation image transmitted therethrough, as far as the above-described phosphor gives stimulated emission upon excitation with the above-mentioned electromagnetic wave after exposure to the radiation. Examples of the radiation employable in the invention include those generally known, such as X-rays, cathode rays and ultraviolet rays. Likewise, there is no specific limitation on the radiation radiated by an object for obtaining a radiation image thereof, as far as the radiation can be absorbed by the above-described phosphor in the form of an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated by the object, there can be employed, for instance, light sources providing light having the band spectrum distribution in the wavelength region of 400–550 nm (550 nm is not inclusive); and light sources providing light of a single wavelength such as a He-Cd laser (441.6 nm), and an Ar ion laser (457.9 nm, 488.0 nm, 514.5 nm). Among the above-mentioned sources of stimulating rays, the lasers are preferred because the radiation image storage panel is exposed thereto with a high energy density per unit area. Particularly preferred is an Ar ion laser, because its oscillation wavelengths are near to the peak wavelength in the stimulation spectrum of the phosphor employed in the present invention and its strong power enables to shorten the period of time for reading out the radiation image as the emitted light (stimulated emission) from the panel.

As the light source for erasing the radiation energy remaining in the radiation image storage panel, a light source at least providing light of a wavelength within the stimulation wavelength region of the above-mentioned phosphor is employed. Examples of the light source employable in the method of the present invention include a fluorescent lamp, a tungsten lamp, a halogen lamp, a metal halide lamp, a mercury lamp and a high-pressure sodium lamp as well as the above-mentioned sources of stimulating rays.

The stimulable phosphor employable in the radiation image recording and reproducing method of the present invention will be described hereinafter.

The divalent europium barium fluorobromide stimulable phosphor employed in the invention emits light of high intensity (stimulated emission) with the peak at a wavelength of approx. 390 nm, and the phosphor is required to give the stimulation spectrum that the intensity of emission at the stimulation wavelength of 500 nm is higher than the intensity of emission at the stimulation wavelength of 600 nm.

The divalent europium activated barium fluorobromide phosphor having the above-mentioned stimulation spectrum can be obtained by introducing bromine atom into the starting materials for phosphor in an amount more than the stoichiometric amount (more that 1 gram equivalent of Br for 1 mole of $BaFBr:Eu^{2+}$) in the preparation of a divalent europium activated barium fluorobromide phosphor ($BaFBr:Eu^{2+}$). The phosphor can be prepared, for instance, by employing bromine in an amount more than the stoichiometric amount in the conventional process for the preparation of the phosphor as described below.

A mixture of staring materials for the phosphor is prepared by using predetermined amounts of barium fluoride and a compound of trivalent europium, and a barium halide (except for barium fluoride) in an amount more than the stoichiometric amount. Then the mixture of starting materials is fired. The so fired product is subsequently pulverized and classified, if desired. For obtaining the homogeneous mixture of starting materials, it is preferred to prepare the mixture in the form of an aqueous suspension, and in this case the suspension is heated to dryness prior to being subjected to the firing stage.

A divalent europium activated barium fluorobromide phosphor prepared in the above-described process by using 0.525 mol of $BaBr_2$ for 1 mol of $BaFBr:0.001Eu^{2+}$, which is an example of the phosphor employable in the radiation image recording and reproducing method of the present invention, has the stimulation spectrum a shown in FIG. 2.

Spectrum a in FIG. 2 is a spectrum (stimulation spectrum) showing a variation of the intensity of light at a wavelength of 390 nm emitted by the above prepared phosphor when the phosphor is given an energy of lights having different wavelengths, in which the energy is very low for reading out just a small portion of the energy stored in the phosphor, namely, approx. 6 $\mu J/cm^2$. In the graph of FIG. 2, a stimulation wavelength is given on the lateral axis and the relative emission intensity is given on the vertical axis. As is evident from Spectrum a in FIG. 2, the emission intensity reaches the maximum showing a peak at the stimulation wavelength of 500 nm, and in contrast the emission intensity at the stimulation wavelength of 600 nm is relatively low so that Spectrum a shows a small shoulder at 600 nm.

Spectrum c in FIG. 2 is a well known stimulation spectrum of the conventional divalent europium activated barium fluorobromide phosphor, that is, the phosphor prepared in the same process as described above by using just 0.5 mol of $BaBr_2$ for 1 mol of $BaFBr:0.001Eu^{2+}$.

The difference of stimulation spectrum in two kinds of the divalent europium activated barium fluorobromide phosphors prepared by using the different amounts of bromine is presumably stemmed from the following reason: The phosphor employed in the radiation image recording and reproducing method of the invention which shows Spectrum a in FIG. 2 is in a condition of Br rich or excessive, while the phosphor showing Spectrum c is in a condition of Br poor or lack. Since bromine evaporates easily more than fluorine does in the firing stage of the process for the preparation of phosphor, the latter conventional phosphor showing Spectrum c is presumed to be in the condition of Br lack. More in detail, in the phosphor showing Spectrum c, a vacant lattice produced in the $Br^-$ ion position inside of BaFBr crystal structure which is the host of the divalent europium activated barium fluorobromide phosphor serves as a color center, and the light emission (stimulated emission) is produced from the electrons trapped in the $Br^-$ vacant lattices. On the other hand, in the phosphor employed in the present invention showing Spectrum a, the color center is positioned at a $F^-$ vacant lattice in place of the $Br^-$ vacant lattice, and the light emission is produced from the electrons trapped in the $F^-$ vacant lattices.

The above-described phosphor is given by no means to restrict the divalent europium activated barium fluorobromide phosphor employable in the radiation image recording and reproducing method of the present invention. Any other phosphors having a different formula can be also employed, provided that the phosphor has such a stimulation spectrum that the emission intensity at the wavelength of 500 nm is higher than that at the wavelength of 600 nm. However, bromine is preferably incorporated into the starting materials in an amount not exceeding 1.1 gram equivalent for 1 mol of $BaFBr:Eu^{2+}$. Further, an amount of less than 50% of bromine can be substituted with chlorine and/or iodine.

In the radiation image recording and reproducing method of the present invention, the above-mentioned divalent europium activated barium fluorobromide phosphor is employed in the form of a radiation image storage panel containing thereof. The radiation image storage panel, as described hereinbefore comprises a support and a phosphor layer provided thereon comprising a binder and the above-described phosphor dispersed therein.

The radiation image storage panel having the above-described structure can be prepared, for instance, in the following manner.

In the first place, the above-described stimulable phosphor particles and a binder are added to an appropriate solvent such as a lower alcohol, chlorinated hydrocarbon, ketone, ester or ether, and then they are mixed well to prepare a coating dispersion containing the stimulable phosphor particles homogeneously dispersed in the binder solution.

Representative examples of the binder include proteins such as gelatin and synthetic polymers such as polyvinyl acetate, nitrocellulose, polyurethane, polyvinyl alcohol and linear polyester.

The ratio between the binder and the stimulable phosphor in the coating dispersion is generally within the range of from 1:8 to 1:40 (binder : phosphor, by weight).

Then the coating dispersion is applied evenly to the surface of the support to form a layer of the coating dispersion. The layer of the coating dispersion is heated slowly to dryness so as to complete the formation of a phosphor layer. The thickness of the phosphor layer is generally within the range of 50-500 $\mu$m.

The support material can be selected from those employed for the radiographic intensifying screens in the conventional radiography. Examples of the support material include plastic films such as films of cellulose acetate and polyethylene terephthalate, metal sheet such as aluminum foil, ordinary papers, baryta paper, and resin-coated papers.

The surface of the support to receive the phosphor layer may be provided with additional layers such as an adhesive layer, a light-reflecting layer and a light-absorbing layer.

Further, a transparent protective film may be provided on the surface of the phosphor layer not facing the support to physically and chemically protect the phosphor layer. Examples of the material employable for the transparent protective film include cellulose acetate, polymethyl methacrylate, polyethylene terephthalate and polyethylene. The transparent protective film generally has a thickness within the range of appox. 3-20 $\mu$m.

The present invention will be illustrated by the following examples, but these examples by no means restrict the invention.

EXAMPLE 1

175.4 g. of barium fluoride ($BaF_2$) and 336.6 g. of barium bromide ($BaBr_2.2H_2O$) were mixed well using an alumina mortar for 30 min. and heated to 150° C. for 2 hours to produce barium fluorobromide (BaFBr). To the barium fluorobromide was added a hydrobromic acid solution (HBr; 47weight %) containing 0.352 g. of europium oxide ($Eu_2O_3$), and the resultant was mixed well to give a suspension. The suspension was dried at 130° C. under reduced pressure for 2 hours. The dried product was pulverized using an automortar made of highly pure alumina for 1 hour to obtain a mixture of barium fluorobromide and europium bromide ($EuBr_3$), which is stoichiometrically represented by the composition formula of $Ba_{1.005}FBr_{1.01}:0.001Eu$.

100 g. of the mixture of starting materials was then placed in a quartz boat, which was, in turn, placed in a tubular furnace for carrying out the first firing. The first firing was conducted at 900° C. for 2 hours in a stream of nitrogen gas containing 3 weight % of hydrogen gas flowing at the rate of 300 ml/min. After the firing was complete, thus fired product was taken out of the furnace and allowed to stand for cooling.

Subsequently, the product obtained in the above first firing stage was pulverized for 20 hours by means of an alumina ball mill. The pulverized mixture was again placed in a quartz boat and fired in a tubular furnace for carrying out the second firing. The second firing was conducted at 600° C. for 2 hours in the same stream as employed in the first firing stage. After the second firing stage was complete, the fired product was taken out of the furnace and allowed to stand for cooling to obtain a powdery divalent europium activated barium fluorobromide phosphor.

A radiation image storage panel was prepared by using the obtained phosphor as follows.

To a mixture of the powdery phosphor and a linear polyester resin were added successively methyl ethyl keton and nitrocellulose (nitrification degree: 11.5%), to prepare a dispersion containing the phosphor and the binder (20:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing carbon black (support, thickness: 250 $\mu$m) placed horizontally on a glass plate. The application of the coating dispersion was carried out using a doctor blade. The support having a layer of the coating disersion was then placed in an oven and heated at a temperature gradually rising from 25° to 100° C. Thus, a phosphor layer having thickness of 200 $\mu$m was formed on the support.

On the phosphor layer was placed a transparent polyethylene terephthalate film (thickness: 12 $\mu$m; provided with a polyester adhesive layer on one surface) to combine the transparent film and the phosphor layer with the adhesive layer. Thus, a radiation image storage panel consisting essentially of a support, a phosphor layer and a transparent protective film was prepared.

EXAMPLE 2

The procedure of Example 1 was repeated except for using 350.0 g. of barium bromide (BaBr$_2$.2H$_2$O) to prepare a mixture of barium fluorobromide and europium bromide, which stoichiometrically represented by the composition formula of Ba$_{1.025}$FBr$_{1.05}$:0.001Eu. A powdery divalent europium activated barium fluorobromide phosphor was obtained by the same firing and pulverizing procedures as described in Example 1.

Then, a radiation image storage panel consisting essentially of a support, a phosphor layer and a transparent protective film was prepared by using the so obtained phosphor in the same manner as described in Example 1.

Comparison Example 1

The procedure of Example 1 was repeated except for using 333.3 g. of barium bromide (BaBr$_2$.2H$_2$O) to prepare a mixture of barium fluorobromide and europium bromide, which stoichiometrically represented by the composition formula of BaFBr:0.001Eu. A powdery divalent europium activated barium fluorobromide phosphor was obtained by the same firing and pulverizing procedures as described in Example 1.

Then, a radiation image storage panel consisting essentially of a support, a phosphor layer and a transparent protective film was prepared by using the so obtained phosphor in the same manner as described in Example 1.

Comparison Example 2

The procedure of Example 1 was repeated except for using 316.6 g. of barium bromide (BaBr$_2$.2H$_2$O) to prepare a mixture of barium fluorobromide and europium bromide, which stoichiometrically represented by the composition formula of Ba$_{0.975}$FBr$_{0.95}$:0.001Eu. A powdery divalent europium activated barium fluorobromide phosphor was obtained by the same firing and pulverizing procedures as described in Example 1.

Then, a radiation image storage panel consisting essentially of a support, a phosphor layer and a transparent protective film was prepared by using the so obtained phosphor in the same manner as described in Example 1.

The stimulation spectra of the phosphors obtained as above are given in FIG. 2.

FIG. 2 shows two stimulation spectra a and c of the phosphors at the emission wavelength of 390 nm given when excited with a light in the wavelength region of 400–900 nm immediately after exposure to X-rays at voltage of 80 KVp. FIG. 2 also shows two stimulation spectra b and d of the phosphors obtained under the same conditions as above except that the phosphors were allowed to stand for 24 hours (at 25° C.) after exposure to X-rays, and thereafter excited.

In FIG. 2,

Spectrum a: the stimulation spectrum of the phosphors of Examples 1 and 2 obtained immediately after the exposure to X-rays;

Spectrum b: the stimulation spectrum of the phosphors of Examples 1 and 2 obtained after 24 hours from the exposure to X-rays;

Spectrum c: the stimulation spectrum of the phosphors of Comparison Examples 1 and 2 obtained immediately after the exposure to X-rays; and Spectrum d: the stimulation spectrum of the phosphors of Comparison Examples 1 and 2 obtained after 24 hours from the exposure to X-rays.

As is evident from FIG. 2, the stimulation spectrum, in which the emission intensity at the stimulation wavelength of 500 nm is higher than that at the stimulation wavelength of 600 nm, of the phosphors (of Examples 1 and 2) employed in the radiation image recording and reproducing method of the present invention hardly varies with a lapse of time. In contrast, the stimulation spectrum, in which the emission intensity at the stimulation wavelength of 500 nm is lower than that at the stimulation wavelength of 600 nm, of the phosphors (of Comparison Examples 1 and 2) markedly varies with a lapse of time.

The radiation image storage panels prepared in the aforementioned examples were evaluated on the fading phenomenon, the sensitivity and the appearance of after-image by the following methods. These items are of value for performing the radiation image recording and reproducing method.

(1) Fading Phenomenon

The radiation image storage panel was exposed to X-rays at voltage of 80 KVp. The panel was immediately scanned with an Ar ion laser beam (wavelength: 514.5 nm) having an energy intensity of $1 \times 10^{-5}$ J/cm$^2$ (the preliminary read-out procedure) and measured on the amount of stimulated emission. Then, the panel was scanned with an Ar ion laser beam having an energy intensity of $2.4 \times 10^{-4}$ J/cm$^2$ (the final read-out procedure) and measured on the amount of stimulated emission.

A ratio of the amount of stimulated emission (value of preliminary read-out/value of final read-out) were calculated.

The radiation image storage panel allowed to stand for 24 hours at 25° C. after the exposure to X-rays was also measured on the amounts of stimulated emissions in the preliminary read-out procedure and in the final read-out procedure, respectively and the ratio thereof was calculated.

The results on the evaluation of the panels are set forth in Table 1.

TABLE I

|  | Ratio of Amount of Emission | |
| --- | --- | --- |
|  | Immediately | After 24 Hours |
| Example 1 | 17.0 | 17.2 |
| Com. Example 2 | 16.0 | 16.7 |

(2) Sensitivity

The radiation image sotrage panel was excited with an Ar ion laser beam (wavelength: 514.5 nm) after exposure to X-rays at voltage of 80 KVp to measure the sensitivity.

The results on the evaluation of the panels are set forth in Table 2.

TABLE 2

|  | Relative Sensitivity (%) |
| --- | --- |
| Example 1 | 120 |
| Example 2 | 120 |
| Com. Example 1 | 100 |

(3) Appearance of after-image

The radiation image storage panel was exposed to X-rays at voltage of 80 KVp and subsequently scanned with an Ar ion laser beam (wavelength: 514.5 nm) in a scanning density of 10 line/min. to excite the phosphor contained therein and give the phosphor to release stimulated emission. To the panel was further applied a white fluorescent light at a level capable of decreasing the intesity of stimulated emission given thereby to $10^{-6}$–$10^{-5}$ of the initial value, so as to substantially erase the X-rays energy remaining in the panel. After the panel was allowed to stand for 72 hours at 25° C., the panel was again scanned with a He-Ne laser beam to obtain the intensity of stimulated emission.

The results on the evaluation of the panels are set forth in Table 3. The intensity of stimulated emission is represented by a ratio based on the initial value.

TABLE 3

| | Intensity of Stimulated Emission | |
|---|---|---|
| | Upon Erasure | After 72 Hours |
| Example 1 | $1 \times 10^{-6}$ | $1 \times 10^{-6}$ |
| Example 2 | $1 \times 10^{-6}$ | $1 \times 10^{-6}$ |
| Com. Example 1 | $1 \times 10^{-6}$ | $5 \times 10^{-6}$ |
| Com. Example 2 | $5 \times 10^{-6}$ | $5 \times 10^{-5}$ |

We claim:

1. A radiation image recording and reproducing method comprising steps of:
   (i) causing a radiation image storage panel to absorb a radiation having passed through an object or having radiated from an object, the radiation image storage panel containing a divalent europium activated barium fluorobromide phosphor having the bromine-containing portion stoichometrically in excess of the fluorine and showing a stimulation spectrum in which the emission intensity at the stimulation wavelength of 500 nm is higher than the emission intensity at the stimulation wavelength of 600 nm;
   (ii) exposing said radiation image storage panel to an electromagnetic wave having a wavelength within the range of 400–550 nm, the wavelength of 550 nm being exclusive, to release the radiation energy stored therein as light emission; and
   (iii) detecting the emitting light.

2. The radiation image recording and reproducing method as claimed in claim 1, in which said electromagnetic wave is Ar ion laser beam.

3. The radiation image recording and reproducing method as claimed in claim 1, wherein said bromine-containing portion consists of bromine.

4. The radiation image recording and reproducing method as claimed in claim 1, wherein said bromine-containing portion consists of bromine and chlorine.

5. The radiation image recording and reproducing method as claimed in claim 1, wherein said bromine-containing portion consists of bromine and iodine.

6. The radiation image recording and reproducing method as claimed in claim 1, wherein said bromine-containing portion consists of bromine and chlorine and iodine.

* * * * *